US009230397B2

(12) United States Patent
Watkins et al.

(10) Patent No.: US 9,230,397 B2
(45) Date of Patent: Jan. 5, 2016

(54) SLOT MACHINE GAME WITH BONUS GAME HAVING SELECTABLE MODIFIER ELEMENTS

(71) Applicant: Multimedia Games, Inc., Austin, TX (US)

(72) Inventors: Brian Alexander Watkins, Austin, TX (US); Wardell Brown, Austin, TX (US); Allison Pope, Austin, TX (US)

(73) Assignee: EVERI GAMES INC., Austin, TX (US)

( * ) Notice: Subject to any disclaimer, the term of this patent is extended or adjusted under 35 U.S.C. 154(b) by 0 days.

(21) Appl. No.: 14/170,998

(22) Filed: Feb. 3, 2014

(65) Prior Publication Data

US 2015/0221164 A1 Aug. 6, 2015

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |
| ***G07F 17/34*** | (2006.01) |

(52) U.S. Cl.
CPC ............ *G07F 17/3213* (2013.01); *G07F 17/34* (2013.01)

(58) Field of Classification Search
USPC ........................ 463/16, 17, 18, 20, 25, 30, 32
See application file for complete search history.

(56) References Cited

U.S. PATENT DOCUMENTS

| | | | | |
|---|---|---|---|---|
| 6,645,074 | B2 * | 11/2003 | Thomas et al. | 463/20 |
| 7,959,508 | B2 * | 6/2011 | Gauselmann | 463/25 |
| 2005/0255902 | A1 * | 11/2005 | Lind | 463/16 |
| 2006/0073874 | A1 | 4/2006 | Cregan et al. | |
| 2010/0016055 | A1 * | 1/2010 | Englman | 463/20 |

* cited by examiner

*Primary Examiner* — Adetokunbo O Torimiro
(74) *Attorney, Agent, or Firm* — Nathan H. Calvert, Esq.; Russell D. Culbertson, Esq.; JP Cody, Esq.

(57) ABSTRACT

A slot game includes a secondary game which upon being triggered displays an initial set of selectable symbols arranged on a touchscreen display at the gaming device, the player being provided ability to make selections from the selectable symbols until all selectable symbols have been selected, each selectable symbol corresponding to an associated benefit which is one of an award, an award enhancer, or one or more additional selectable symbols. If an option is picked revealing additional selectable symbols, the game adds more picks having associated benefit like those of the initial set and the player keeps selecting. The game may also have a "game pick" in which it removes one or more of the remaining unselected choices without awarding an associated benefit.

15 Claims, 11 Drawing Sheets

Fig. 1A
Fig. 1B
CHICKEN & EGG
BONUS
PICK EGGS FOR PRIZES
FOX STEALS AN EGG AFTER EACH TURN
FIND A CHICKEN TO LAY MORE EGGS!
TOUCH SCREEN TO BEGIN
CREDITS
9500
BET 500
TOTAL PICKS 0
WIN
0
CHICKEN & EGG BONUS
PICK AN EGG!
CREDITS
9500
BET 500
TOTAL PICKS 0
WIN
0

Fig. 1G
TOTAL BONUS
6000
WON
CREDITS
9500
BET 500
TOTAL PICKS 7
WIN
6000

SLOT MACHINE GAME WITH BONUS GAME HAVING SELECTABLE MODIFIER ELEMENTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all rights.

TECHNICAL FIELD OF THE INVENTION

The invention relates to gaming machines and systems, wherein the players participate in wagering games. More particularly, the invention relates to methods for conducting an interactive reel or symbol array type wagering games.

BACKGROUND OF THE INVENTION

Various slot machine games using player interaction to enhance the game experience for games with reels, simulated reels, or other arrays of gaming symbols. Some games use player selection bonus rounds to increase excitement by providing extra prizes, or to provide extra spins to the player. Typically, these rounds include a designated number of items from which the player can select to reveal a prize or benefit of some type. The player may be given a fixed number of selections or may be allowed to pick until all selections are gone. Although this is entertaining, many of the rounds lack variety because of the fixed length and lack of prize options. What is needed is a player selection bonus that provides more player variety by enabling different ways to vary the selection round.

SUMMARY OF THE INVENTION

The present invention includes a highly entertaining method of conducting a game for one or more players. The entertainment value is achieved by a slot game including a secondary game which upon being triggered displays an initial set of selectable symbols arranged on a touchscreen display at the gaming device, the player being provided ability to make selections from the selectable symbols until all selectable symbols have been selected, each selectable symbol corresponding to an associated benefit which is one of an award, an award enhancer, or one or more additional selectable symbols. If an option is picked revealing additional selectable symbols, the game adds more picks having associated benefit like those of the initial set and the player keeps selecting. The game may also have a "game pick" in which it removes one or more of the remaining unselected choices without awarding an associated benefit.

Another version of the invention is a computer program stored on a non-transitory readable medium. The software version is, of course, typically designed to be executed by a gaming machine or networked gaming system. The software includes multiple portions of computer executable code referred to as program code. Gaming results are provided in response to a wager and displayed by display program code that generates simulated slot reels each including one or more symbol locations. The program also has game controller program code for determining game play results involving spins or other randomization of an array of symbols, and providing the selectable bonus modifier elements in the bonus round.

Another version of the invention is a gaming system that includes one or more gaming servers, and a group of electronic gaming machines connected to the servers by a network. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touch screen input from the player and to display graphics received from the server.

Different features may be included in different versions of the invention. For example, different animation themes may be applied that display the application of the player selection bonus field in different ways.

These and other advantages and features of the invention will be apparent from the following description of the preferred embodiments, considered along with the accompanying drawings.

DETAILED DESCRIPTION OF PREFERRED EMBODIMENTS

Figure 1A:
FIG. 1A is a representation of a graphic display of a game screen example according to one embodiment of the invention.
Figure 1B:
FIGS. 1B-1G are an example sequence of gaming screens that occur in the player selection bonus round in a preferred embodiment.

FIG. 1A is representation a graphic display of an example game screen 1000 according to an embodiment of the invention. In this representation, game screen 1000 is shown after the base game has achieved a bonus activation outcome such as a scatter or line pattern of special symbols. The displayed screen shows the player instructions for the player selection bonus round, referred to in this game as the Chicken & Egg Bonus.

FIGS. 1B-1G are an example sequence of gaming screens that occur in the player selection bonus round in a preferred embodiment. These illustrations will be further described with respect to the flow charts of the selection bonus round in FIG. 2A-B.

Figure 1C:
Figure 1D:
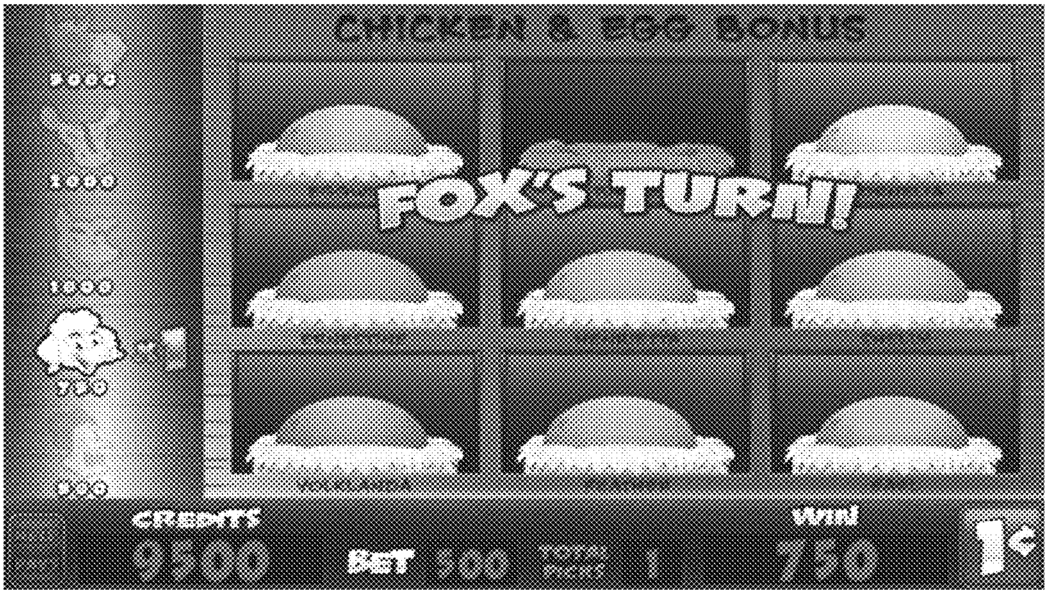
Figure 1E:
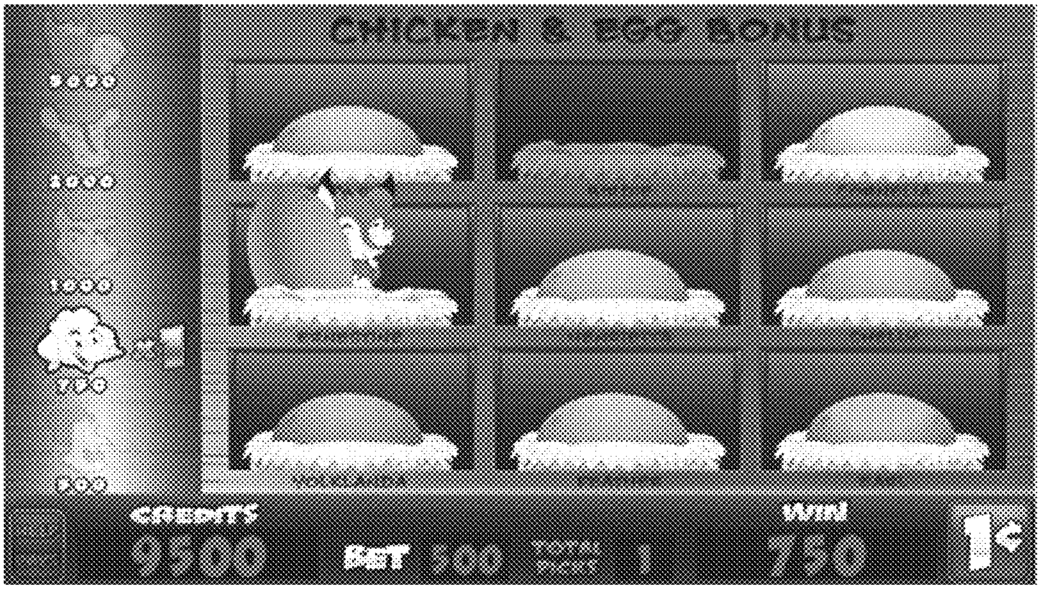
Figure 1F:
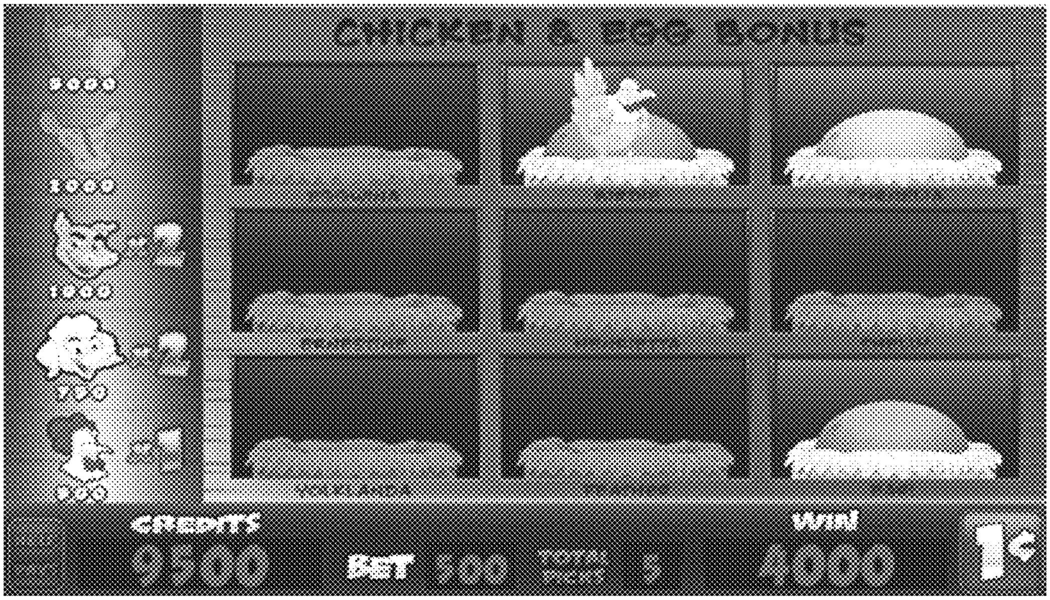
Figure 1G:
Figure 1J:
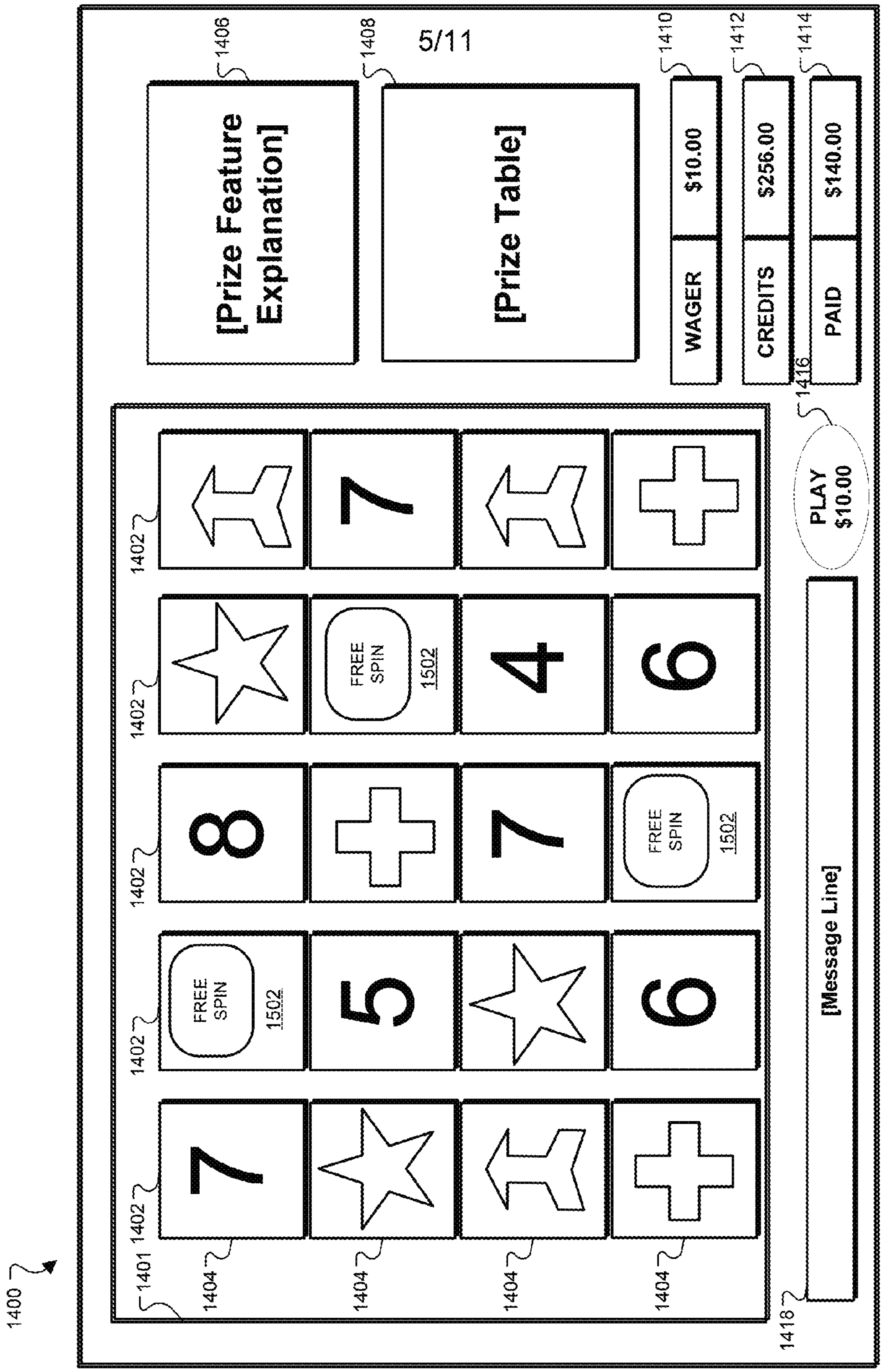
FIG. 1J is an example diagram of a base game screen.

FIG. 1J is a game screen diagram for an example base game that might be employed with the selection bonus game herein. In this example embodiment, game screen 1400 has a matrix of symbol locations 1401. The matrix of symbol locations 1401 consists of five reels 1402, and each reel has four positions 1404. In this example, the player has already placed a wager, and started a wagering game. In this game screen diagram 1400, three player selection symbols 1502 have been revealed, comprising a scatter pattern which activates the selection bonus round. Other activating patterns may be a line pattern or a straight line pattern across all five reels, for example. Further, other suitable activations such as a mystery activation may be used to take the depicted game from the base game in FIG. 1J to the selection bonus game shown in the other Figures.

Referring to the other items in the depicted example screenshot, next to the matrix of symbol locations 1401 there is an area that has a prize feature explanation 1406. Underneath the area that has a prize feature explanation 1406 there is a prize table 1408. Under the prize table 1408 are found the current wager 1410, available credits 1412, and the payout 1414. Along the bottom of the game screen 1400 there are found a message line 1418, and a listing of the minimum wager 1416.

Figure 2A:
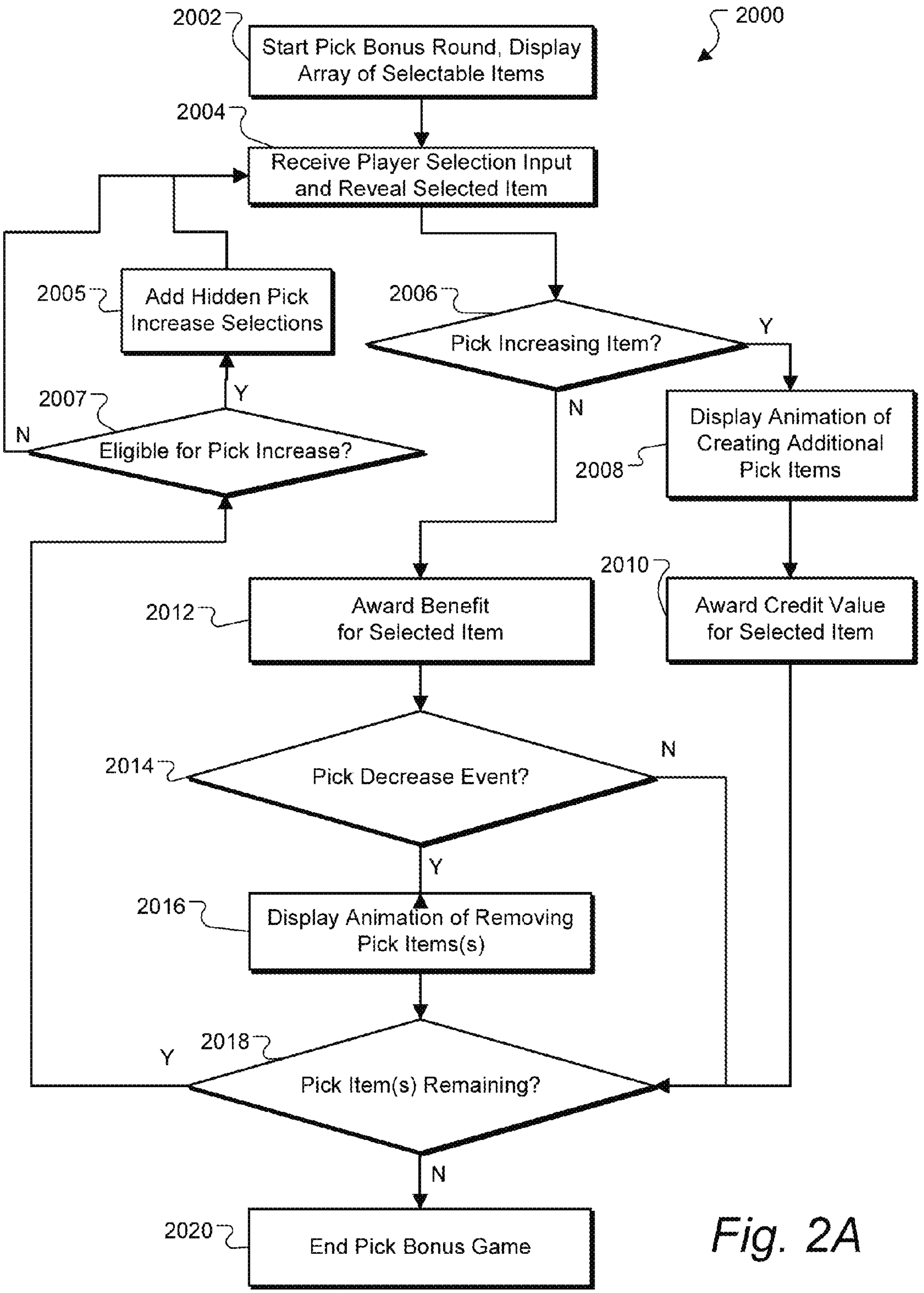
FIG. 2A is a flowchart showing an example of the general game play process at a gaming machine that includes the player selection bonus sequence.

FIG. 2A is a flowchart showing an example embodiment of the player selection bonus round. In this embodiment, the process starts flow chart 2000 at step 2002 where the player selection bonus game has already been activated, and displays a group of selectable items, preferably as a grid of selectable symbols such as those shown in FIG. 1B. Next, the process goes to step 2004, where it prompts the player and receives a selection of a symbol from the grid, preferably by touch-screen input, but maybe by button selection, voice recognition, or other player input means. In a preferred embodiment, each selectable symbol corresponds to an associated benefit which is one of an award (credit prize), an award enhancer (for example, a multiplier value which applies to one or more subsequent picks of credit awards, or a prize bump feature that bumps the award one level upward on a prize table), or one or more additional selectable symbols. Other embodiments may have a different prize listing that may or may not include one or more of the options listed. Generally upon being triggered, the second game displaying an initial set of selectable symbols arranged on a touchscreen display at the gaming device, the player being provided ability to make selections from the selectable symbols until all selectable symbols have been selected at step 2004 with the process being repeated and looping back to 2004.

At step 2006, if the player picks a selectable symbol corresponding to the one or more additional selectable symbols, or "pick increasing", the process displays the one or more additional selectable symbols appearing together with remaining unselected ones of the initial set of selectable symbols, preferably as an animation of the additional pick items being created. For example, this is shown in FIG. 1F where the animation depicts a chicken laying three additional eggs in the matrix, in empty locations. The additional selectable symbols each have an associated benefit like those of the initial set, with the additional selectable symbols and the remaining unselected ones of the initial set forming a second set of selectable symbols available to be picked for the next player selection. Further, the process at step 2006 may also determine how many additional selectable items will be added. In some versions, the number is fixed at, for example, three items. In other cases, it is randomly determined within a range but it is preferably constrained not to overflow the number of selectable symbols that can fit on the screen. Also, if a random determination is used, the available choices from which a random selection is made may be influenced by the sequence of past events in the bonus round, or by the current scenario of the bonus round (e.g. if the player has made abnormally low-awarding pick selections up until the current point, the random choices might adjust to give them a richer distribution of the number of selectable symbols to add).

After step 2008 where the new picks are created, the process goes to step 2010 and awards any credit value due for the selected item. Next, it goes to step 2018 where the game decides to continue or end based on whether there are any remaining selectable symbols (pick items) remaining to be selected. In this manner, the pick bonus round continues until all the pick items have been removed, and may increase in length whenever additional pick items are provided at step 2108.

If there is not a pick increasing item selected back at step 2006, the process instead goes to step 2012, where it awards the credit value or other benefit associated with the player selection made at step 2004. The selection is shown in animation being removed from the matrix and the prize or benefit is shown being added or credited to the player. For example, FIG. 1C shows the results of this step where the animated egg selected by the player is shown to open and reveal a farm animal (sheep) with a credit value of 750 being awarded to the player. The egg at that location is then removed as shown in FIG. 1D, which shows the beginning of the "Fox's Turn", or a pick decrease event of step 2016.

Some versions include the "pick decrease event" as shown at steps 2014-2016, which removes another selection from the available choices without awarding the benefit to the player. Following one or more player selections and the removal of a selectable symbol designated in such selection, the process step 2014 decides whether to include a pick decrease event. If such event is included the process goes to step 2016 and displays an animation of removing one or more of the remaining unselected ones of the initial set without awarding an associated benefit. This is shown, for example, in FIGS. 1D-1E, where the game first announces that a pick decrease or selection removal is occurring (by showing the "Fox's Turn" of FIG. 1D to inform the player a fox will remove an egg from the henhouse), and then shows the game picking one of the selections to remove without giving a benefit to the player, as shown by the fox stealing an egg in FIG. 1E. In some versions every player pick is followed by a pick decrease event at step 2014, while other versions may make a decision at step 2014 based on random input, or other variables such as the status of the game or the number of selections remaining. For example, some versions may include a pick decrease event after every other player selection, or may include the event only if the player would be left with at least one more selection to be made. A randomly-based decision may also be made at step 2014.

If the process determines that there are player selections left in step 2018, then the process returns to step 2004 and prompts the player to select another one of the remaining symbols. If, however, the process finds no remaining player selections in step 2018, then the process moves to step 2020 where it would conclude the player selection bonus round and award any benefits or credits still due to the player. Some embodiments show the award of credits to the player's credit total after each player selection rather than adding the entire bonus credit win to the players total as a separate step.

In some versions, the array of hidden selections does not always include a pick increasing item (additional selections), for example when the array is full of unselected options and cannot hold more pick choices, or when all of the eligible pick increase events have been uncovered by a player. Steps 2005 and 2007 are provided to account for this and provide the game logic the ability to control when pick increasing items are available in the array. Before each player selection but the first, the process checks if the player is eligible to activate the pick increase items, and if so it adds those to the array of choices or activates them as being possible to be randomly provided in response to a player selection input.

Figure 2B:
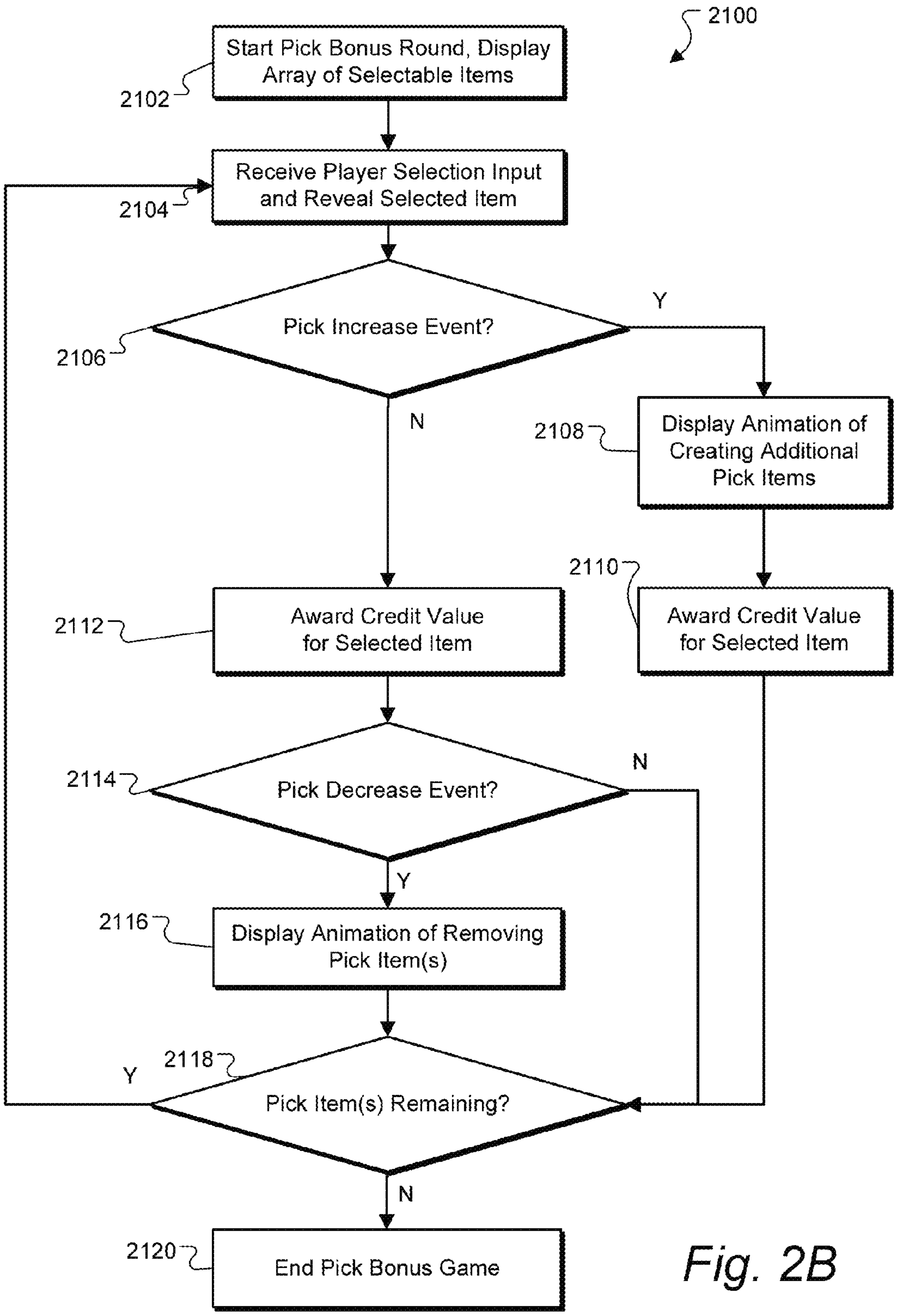
FIG. 2B is a flowchart showing an example of the player selection bonus round logic according to one embodiment of the invention.

FIG. 2B shows a software process flow chart for a player selection round according to another embodiment. The depicted version may include the "pick increase" (additional selectable symbols award) and the "pick decrease" (remove symbols and provide no award for them) as events that occur during the player selection bonus round. The pick increase event at step 2106 may occur in a variety of ways, such as by a random determination, predetermined script in the selection bonus round, or other suitable method such as a points threshold or a player selection of a designated item on the screen. The resulting creation of additional items at step 2108 proceeds similarly to the previously described embodiment. Further, the pick decrease may also occur as an event, rather than after every player selection as is done in the preferred embodiment. The basis for including a pick decrease event in any particular loop through the depicted process may be randomly determined or by other suitable method such as a predetermined script or a designated set of rules for the game. Preferably the game logic controls the pick decrease events such that they never remove the final pick from the screen to end the pick bonus round. For example in the version in FIGS. 1A-G, the fox never takes the last remaining egg from the pick bonus round.

Figure 3A:
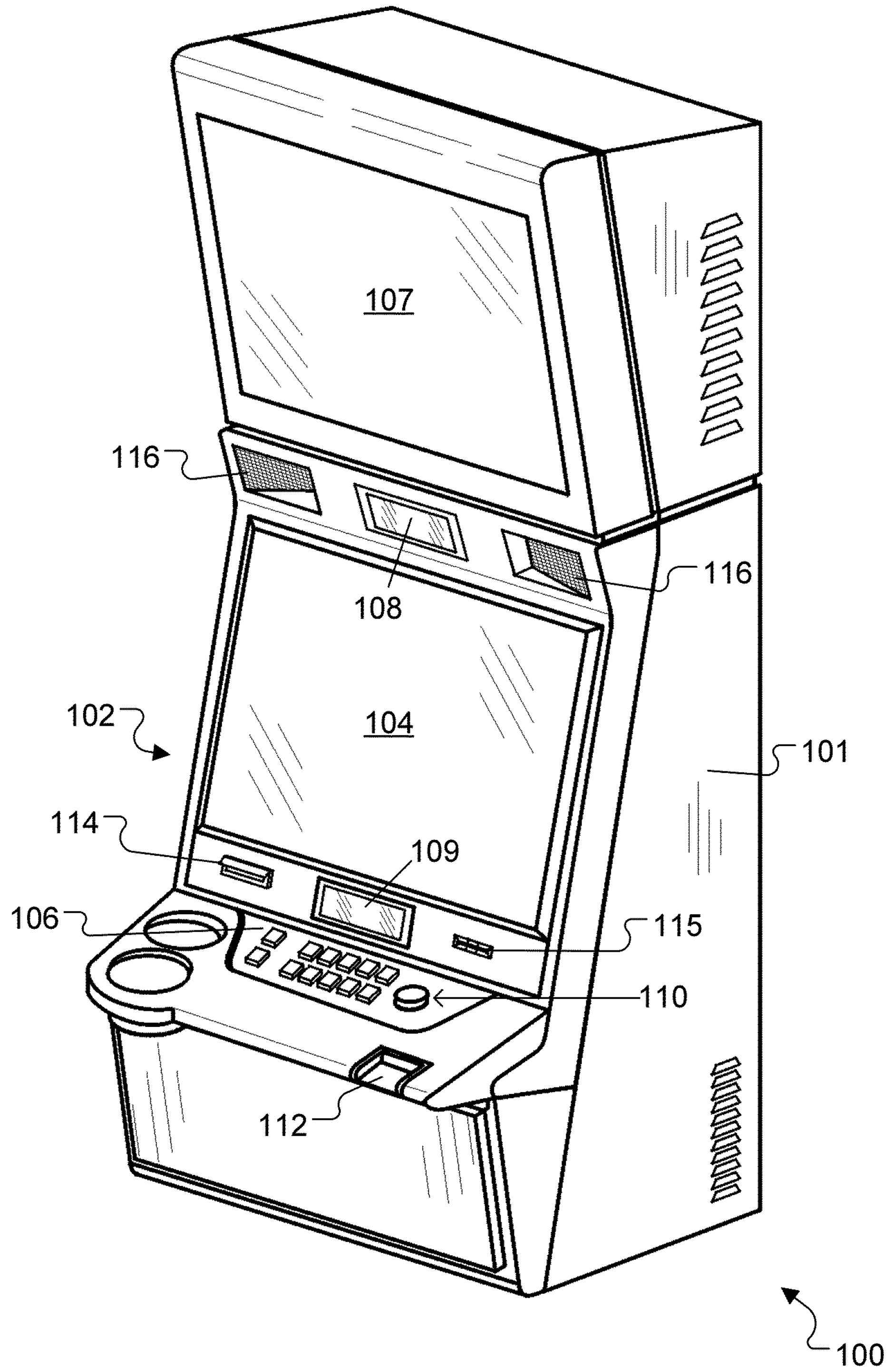
FIG. 3A is a front perspective view of a gaming machine which may be used in a gaming system embodying the principles of the present invention.
Figure 3B:
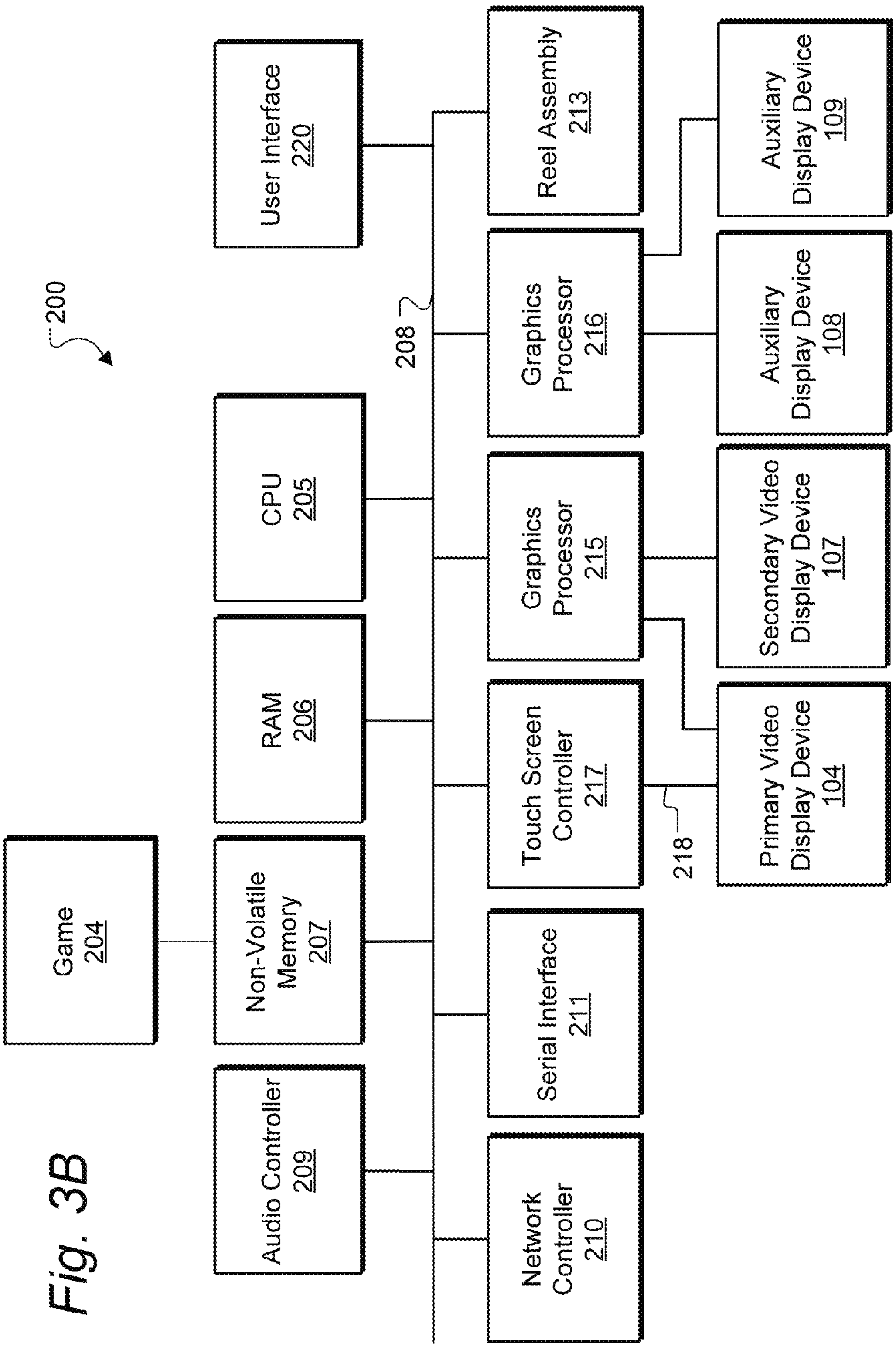
FIG. 3B is a block diagram showing various electronic components of the gaming machine shown in FIG. 3A together with additional gaming system components.

FIG. 3A shows a gaming machine 100 that may be used to implement a player selection bonus game according to the present invention. The block diagram of FIG. 3B shows further details of gaming machine 100. Referring to FIG. 3A, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 3A also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the user's playing experience. Numerous other types of devices may be included in gaming machines that may be used according to the present invention.

FIG. 3B shows a logical and hardware block diagram 200 of gaming machine 100 which includes a central processing unit (CPU) 205 along with random access memory 206 and nonvolatile memory or storage device 207. All of these devices are connected on a system bus 208 with an audio interface device 209, a network controller 210, and a serial interface 211. A graphics processor 215 is also connected on system bus 208 and is connected to drive primary video display device 104 and secondary video display device 107 (both mounted on cabinet 101 as shown in FIG. 3A). A second graphics processor 216 is also connected on system bus 208 in this example to drive the auxiliary display devices 108 and 109 also shown in FIG. 3A. As shown in FIG. 3B, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 3B are elements commonly associated with a personal computer. These elements are preferably mounted on a standard personal computer chassis and housed in a standard personal computer housing which is itself mounted in cabinet 101 shown in FIG. 3A. Alternatively, the various electronic components may be mounted on one or more circuit boards housed within cabinet 101 without a separate enclosure such as those found in personal computers. Those familiar with data processing systems and the various data processing elements shown in FIG. 3B will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 3B as being connected directly on system bus 208 may in fact communicate with the other system components through a suitable expansion bus. Audio interface device 209, for example, may be connected to the system via a PCI bus.

System bus 208 is shown in FIG. 3B merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104 and secondary video display device 107, and graphics processor 216 is shown for controlling both auxiliary display devices 108 and 109, it will be appreciated that CPU 205 may control all of the display devices directly without any intermediate graphics processor. In some embodiments, the Player selection graphics may be displayed on secondary video display 107 rather than beside the array of selectable game pieces on the primary display. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display portions of a player selection bonus game according to the present invention. CPU 205 also executes software related to communications handled through network controller 210, and software related to various peripheral devices such as those connected to the system through audio interface device 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the player selection bonus game as will be discussed below in connection with FIG. 3A.

It should be noted that the invention is not limited to gaming machines employing the personal computer-type arrangement of processing devices and interfaces shown in example gaming machine 100. Other gaming machines through which a player selection bonus game is implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement a player selection bonus game within the scope of the present invention using an electro mechanical arrangement or even a purely mechanical arrangement for displaying the symbols needed to complete the player selection bonus game as described herein. However, the most preferred forms of the invention utilize one or more video display devices for displaying the spinning reels and the selectable modifier elements. For example, a gaming machine suitable for providing a player selection bonus game may include a mechanical reel-type display rather than a video-type display device for displaying results in a primary game, and include a video display device for presenting the player selection bonus game separately.

Still referring to the hardware and logical block diagram 200 showing an example design for a gaming machine 100, the depicted machine in operation is controlled generally by CPU 205 which stores operating programs and data in storage device 207 with wagering game 204, user interface 220, network controller 210, audio/visual controllers, and reel assembly 213 (if mechanical reel configuration). CPU or game processor 205 may comprise a conventional microprocessor, such as an Intel Pentium microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information and game processor 205 may respond according to its programming, such as to apply a wager and initiate execution of a game.

Figure 4A:
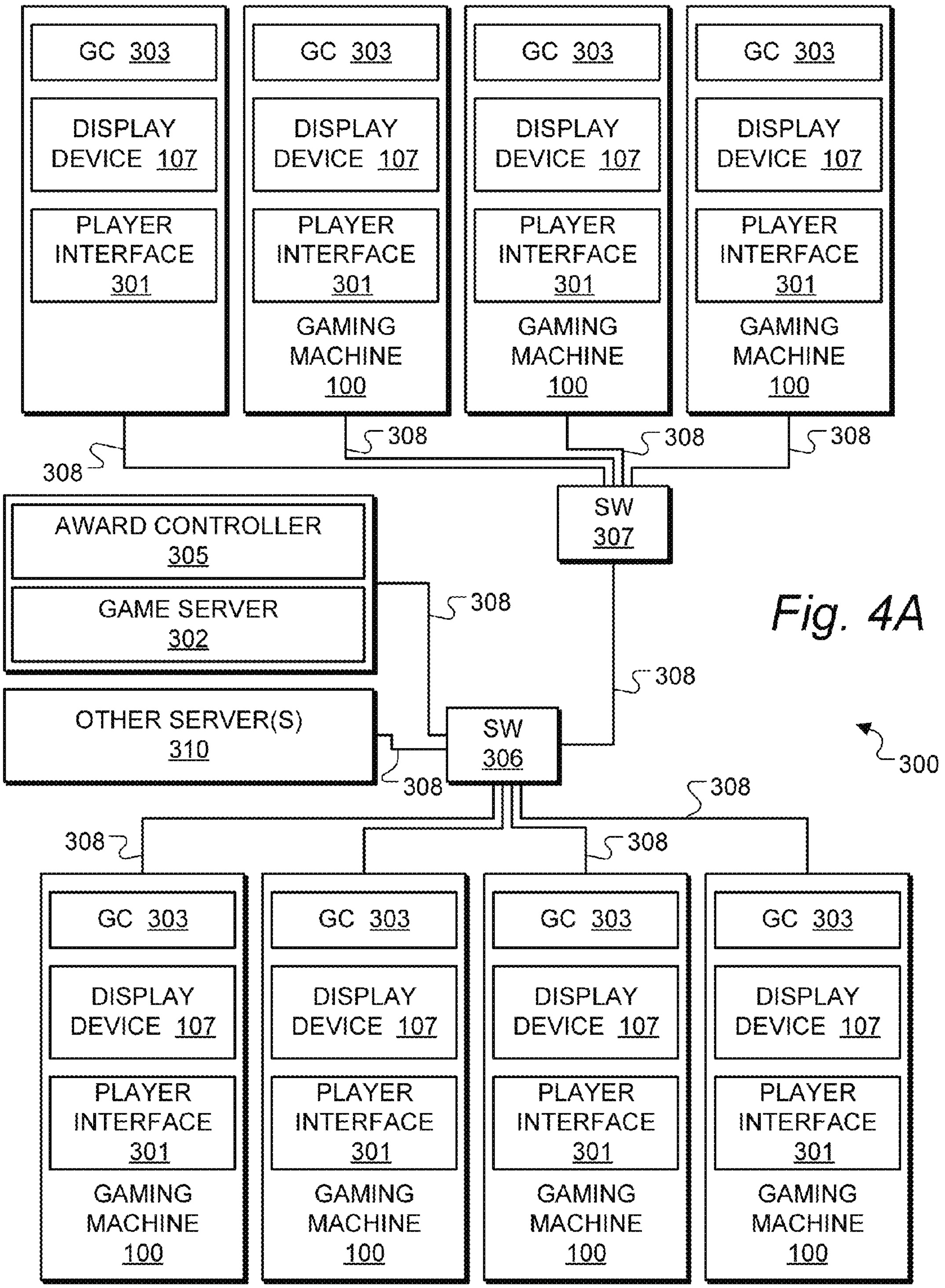
FIG. 4A is a system block diagram of a gaming system according to one embodiment of the present invention.
Figure 4B:
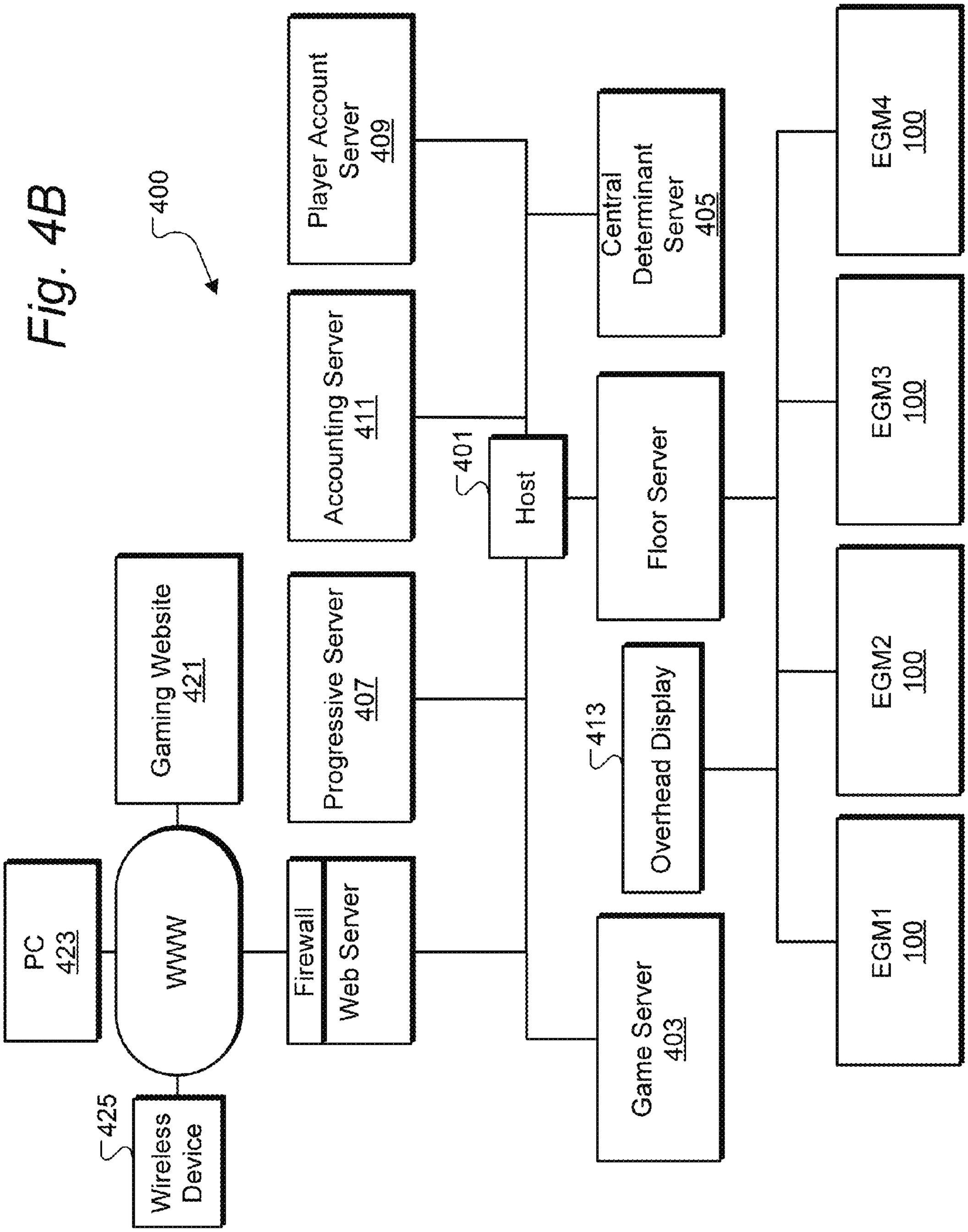
FIG. 4B is a system block diagram of a gaming system according to another embodiment.

Game processor 205 also may connect through network controller 210 to a gaming network, such as example casino server network 400 shown in FIG. 4B. Referring now to FIG. 4B, the casino server network 400 may be implemented over one or more site locations and include host server 401, remote game server 403 (which may be configured to provide game processor functionality including determining game outcomes and providing audio/visual instructions to a remote gaming device), central determination server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Referring now to FIG. 4A, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 4A is shown as including a video display device 107 and a player interface that may include buttons, switches, or other physical controls and/or touch screen controls as discussed above in connection with FIG. 4A. This player interface is labeled 301 in FIG. 4A. System 300 further includes a game server 302 and a respective game client 303 (abbreviated "GC" in FIG. 4A) included with each respective gaming machine 100. In the form of the invention shown in FIG. 4A these two components, game server 302 and the game client components 303 combine to implement a game control arrangement which will be described in detail below. System 300 also includes an award controller 305, which is shown in FIG. 4A as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 4A.

Each gaming machine 100, and particularly player interface 301 associated with each gaming machine, allows a player to make any inputs that may be required to make the respective gaming machine eligible for a player selection bonus game, and make selections of any selectable objects displayed at the respective gaming machine in the course of the player selection bonus game. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a player selection bonus game at the respective gaming machine.

The game control arrangement made up of game server 302 and the respective game client 303 at a given gaming machine functions to control the respective video display device 107 for that gaming machine to display a number of selectable modifier objects. Award controller 305 is responsible for awarding prizes for a player's participation in a player selection bonus game, and maintaining progressive prize information where the player selection bonus game offers one or more progressive prizes. The network arrangement made up of network switches 306 and 307, and the various communication links 308 shown in FIG. 4A is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 4A shows other server(s) 310 included in the network. This illustrated "other server(s)" element 310 may include one or more data processing devices for performing various functions related to games conducted through system 300 and any other games that may be available to players through gaming machines 100. For example, system 300 may be accounting servers providing support for cashless gaming or various forms of mixed cash/cashless gaming through the various gaming machines 100. In this example, an additional one of the other servers 310 will be included in system 300 for supporting these types of wagering and payout systems. As another example, the various gaming machines 100 included in system 300 may allow players to participate in a game (primary game) other than the player selection bonus game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 4A are shown only to indicate that numerous other components may be included along with the elements that participate in providing player selection bonus games according to the present invention. Other server(s) 310 may provide record keeping, player tracking, accounting, result identifying services, or any other services that may be useful or necessary in a gaming system.

Referring to FIG. 4B, a block diagram of another example networked gaming system 400 associated with one or more gaming facilities is shown, including one or more networked gaming machines 100 in accordance with one or more embodiments. With reference to FIG. 4B, while a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective players' video images may be displayed on overhead display 413 along with the content of the player's display 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry cell phone, Apple iPhone, personal data assistant (PDA), iPad, etc.). To enter the website, a player may log in with a username (that may be associated with the player's account information stored on player account server 409 or be accessible by a casino operator to obtain player data and provide promotional offers), play various games on the website, make various personalizing selections, and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming method including the steps of:

providing a first game at a gaming device, the first game operable by a game processor and having a plurality of outcomes determined by the game processor, at least one of the outcomes triggering execution of a second game by the game processor;

upon the second game being triggered, the game processor causing the display of an initial set of selectable symbols arranged on a touchscreen display at the gaming device, the player being provided ability to make selections from the selectable symbols until all selectable symbols have been removed, one or more of the selectable symbols corresponding to an associated benefit which is one of an award, an award enhancer, or one or more additional selectable symbols;

upon one of the selectable symbols corresponding to the one or more additional selectable symbols being selected by the player, displaying the one or more additional selectable symbols together with remaining unselected ones of the initial set of selectable symbols, the additional selectable symbols each having an associated benefit like those of the initial set, the additional selectable symbols and the remaining unselected ones of the initial set forming a second set of selectable symbols; and enabling the player to select one or more of the initial set of selectable symbols or the additional selectable symbols, removing each selected item and providing the associated benefit therefore to the player; and, following the removal of a selectable symbol selected by the player and prior to a subsequent selection by the player of another one of the selectable symbols, the game processor causing one of the remaining unselected ones of the selectable symbols to be removed without awarding an associated benefit.

2. The method of claim 1, wherein the number of selectable symbols is managed such that the player is always allowed to select the final symbol, rather than it being remove without awarding a benefit.

3. The method of claim 1, further comprising providing the initial set of selectable symbols without any additional selectable symbols as associated benefits until making a determination that the second game is eligible for additional selectable symbols, and then making such an associated benefit possible.

4. The method of claim 1, further comprising ending the second game when all of the selectable symbols are removed.

5. The gaming method of claim 1, wherein the possible associated benefits further include a multiplier or a prize bump.

6. A system for providing a wagering game for a player, the system comprising at least one electronic gaming device interacting with at least one server, the system programmed for:

providing a first game at the gaming device, the first game having a plurality of outcomes, at least one of the outcomes triggering a second game;

upon the second game being triggered, the system displaying an initial set of selectable symbols arranged on a touchscreen display at the gaming device, the player being provided ability to make selections from the selectable symbols until all selectable symbols have been removed, each selectable symbol corresponding to an associated benefit which is one of an award, an award enhancer, or one or more additional selectable symbols;

upon one of the selectable symbols corresponding to the one or more additional selectable symbols being selected by the player, displaying the one or more additional selectable symbols together with remaining unselected ones of the initial set of selectable symbols, the additional selectable symbols each having an associated benefit like those of the initial set, the additional selectable symbols and the remaining unselected ones of the initial set forming a second set of selectable symbols; and enabling the player to select one or more of the initial set of selectable symbols or the additional selectable symbols, removing each selected item and providing the associated benefit therefore to the player; and following the removal of a selectable symbol selected by the player and prior to a subsequent selection by the player of another one of the selectable symbols, causing one of the remaining displayed selectable symbols to be removed without awarding an associated benefit.

7. The system of claim 6, further programmed for managing the number of selectable symbols such that the player is always allowed to select the final symbol, rather than it being removed without awarding a benefit.

8. The system of claim 6, further programmed for providing the initial set of selectable symbols without any additional selectable symbols as associated benefits until making a determination that the second game is eligible for additional selectable symbols, and then making such an associated benefit possible.

9. The system of claim 6, further programmed for ending the second game when all of the selectable symbols are removed.

10. The system of claim 6, wherein the possible associated benefits further include a multiplier or a prize bump.

11. A program product embodied in one or more tangible computer readable media, the program product including code executable by a gaming machine and at least one gaming server for:

providing a first game at a gaming device, the first game having a plurality of outcomes, at least one of the outcomes triggering a second game;

upon being triggered, the second game displaying an initial set of selectable symbols arranged on a touchscreen display at the gaming device, the player being provided ability to make selections from the selectable symbols until all selectable symbols have been removed, each selectable symbol corresponding to an associated benefit which is one of an award, an award enhancer, or one or more additional selectable symbols;

upon one of the selectable symbols corresponding to the one or more additional selectable symbols, displaying the one or more additional selectable symbols together with remaining unselected ones of the initial set of selectable symbols, the additional selectable symbols each having an associated benefit like those of the initial set, the additional selectable symbols and the remaining unselected ones of the initial set forming a second set of selectable symbols; and enabling the player to select one or more of the initial set of selectable symbols or the additional selectable symbols, removing each selected item and providing the associated benefit therefore to the player; and, following the removal of a selectable symbol selected by the player and prior to a subsequent selection by the player of another one of the selectable symbols, the game processor causing one of the remaining displayed selectable symbols to be removed without awarding an associated benefit.

12. The program product of claim 11, further executable for managing the number of selectable symbols such that the player is always allowed to select the final symbol, rather than it being removed without awarding a benefit.

13. The program product of claim 11, further executable for providing the initial set of selectable symbols without any additional selectable symbols as associated benefits until making a determination that the second game is eligible for additional selectable symbols, and then making such an associated benefit possible.

14. The program product of claim 11, further executable for ending the second game when all of the selectable symbols are removed.

15. The program product of claim 11, wherein the possible associated benefits further include a multiplier or a prize bump.

* * * * *